United States Patent
Meixner et al.

(10) Patent No.: US 6,777,530 B1
(45) Date of Patent: Aug. 17, 2004

(54) USE OF CROSSLINKED NITROGENOUS COMPOUNDS WHICH ARE SOLUBLE OR DISPERSIBLE IN WATER IN DETERGENTS AND CLEANERS

(75) Inventors: Hubert Meixner, Ludwigshafen (DE); Ulrich Steuerle, Heidelberg (DE); Jürgen Decker, Speyer (DE); Wolfgang Paulus, Mainz (DE); Dieter Boeckh, Limburgerhof (DE); Jürgen Alfred Lux, Niederkirchen (DE); Beate Ehle, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 491 days.

(21) Appl. No.: 09/676,780

(22) Filed: Oct. 2, 2000

Related U.S. Application Data

(62) Division of application No. 09/500,534, filed on Feb. 9, 2000, which is a division of application No. 09/284,456, filed as application No. PCT/EP97/05744 on Oct. 17, 1997, now Pat. No. 6,083,898.

(30) Foreign Application Priority Data

Oct. 18, 1996 (DE) ........................................ 196 43 133

(51) Int. Cl.$^7$ ................................................. C11D 3/37
(52) U.S. Cl. ...................................... 528/422; 510/475
(58) Field of Search ........................... 528/422; 510/475

(56) References Cited

U.S. PATENT DOCUMENTS

| | | |
|---|---|---|
| 3,200,106 A | 8/1965 | Dickson et al. |
| 3,793,352 A | 2/1974 | Hochreuter et al. |
| 4,138,352 A | 2/1979 | Teot et al. |
| 4,372,882 A | 2/1983 | Koster et al. |
| 4,507,466 A | 3/1985 | Tomalia et al. |
| 4,634,544 A | 1/1987 | Weber et al. |
| 5,512,699 A | 4/1996 | Connor et al. |
| 5,639,723 A | 6/1997 | Kroner et al. |
| 5,641,855 A | 6/1997 | Scherr et al. |
| 6,083,898 A * | 7/2000 | Meixner et al. ............ 510/499 |

FOREIGN PATENT DOCUMENTS

| | | |
|---|---|---|
| DE | 1 922 450 | 11/1970 |
| DE | 2 165 900 | 6/1973 |
| DE | 31 24 210 A1 | 12/1982 |
| DE | 42 25 620 A1 | 2/1994 |
| DE | 42 44 194 A1 | 6/1994 |
| DE | 43 44 357 A | 6/1995 |
| EP | 0 042 187 A1 | 12/1981 |
| WO | 0 158 260 A3 | 10/1985 |
| WO | WO 98/17764 | 4/1998 |

* cited by examiner

Primary Examiner—John R. Hardee
(74) Attorney, Agent, or Firm—Oblon, Spivak, McClelland, Maier & Neustadt, P.C.

(57) ABSTRACT

The invention relates to the use of crosslinked nitrogenous compounds which are soluble or dispersible in water and are obtainable by crosslinking of (a) compounds containing at least three NH groups with (b) at least bifunctional crosslinkers which react with NH groups, in detergents and cleaners, especially soil release agents.

Compounds (a) are preferably selected from the group consisting of oligo- and polyamines, polyalkylenepolyamines, polyamidoamines, polyamidoamines grafted with (poly)ethyleneimine, and mixtures thereof.

6 Claims, No Drawings

USE OF CROSSLINKED NITROGENOUS COMPOUNDS WHICH ARE SOLUBLE OR DISPERSIBLE IN WATER IN DETERGENTS AND CLEANERS

This application is a Division of application Ser. No. 09/500,534, filed on Feb. 9, 2000, abandoned, which is a divisional application of Ser. No. 09/284,456, filed May 12, 1999, (now U.S. Pat. No. 6,083,898, Issued on Jul. 4, 2000), which was originally filed as International Application No. PCT/EP97/05744, filed Oct. 17, 1997.

The invention relates to the use of crosslinked nitrogenous compounds which are soluble or dispersible in water in detergents and cleaners. The invention particularly relates to the use of crosslinked oligo- and polyamines as soil release agents and enzyme stabilizers in detergents and cleaners.

The use of nitrogenous polymers in detergents is known.

DE-A1-31 24 210 describes liquid detergents with additives to prevent dye transfer. The detergent additionally contains nonionic or zwitterionic surfactants in combination with polyethyleneimines, polyamines, polyamineamides or polyacrylamides, by which transfer of dyes from colored textiles to white or pale-colored textiles on washing together is counteracted. The polyamineamides can be obtained by condensing polybasic acids such as dibasic, saturated, aliphatic $C_{3-8}$-acids and polyamines. The polymers are described as soluble in water but are not identified more exactly.

DE-A-1 922 450 describes detergents and cleaners which contain antiredeposition agents to prevent reabsorption of detached soil on the cleaned surfaces. Polyamides which can be prepared from polyethyleneimines with an average molecular weight of from 300 to 6000 and di- and tricarboxylic acids are used as antiredeposition agents. Products of reactions with diglycolic acid, thiodiglycolic acid, iminodiacetic acid and nitrilotriacetic acid are also mentioned.

DE-A-2 165 900 describes detergents Smith a content of antiredeposition additives The product of the reaction of a polyethyleneimine with a molecular weight of from 430 to 10,000 with $C_{8-18}$-alkyl glycidyl ethers, which may additionally be reacted with ethylene oxide is used as antiredeposition agent.

It is furthermore known to use soil release agents, which are reversibly adsorbed from the wash liquor on the textile or the fibers of the textile during the washing process, in detergents. When a textile treated with such a soil release agent is soiled, in the next wash the adsorbed soil release agent improves detachment of the soil. This soil release effect is thus a reversible antisoil finish on the textile during the washing. Various soil release agents are known such as polyesters from polyethylene oxides with ethylene glycol and/or propylene glycol and aromatic and/or aliphatic dicarboxylic adds. For example, DE-A-43 44 357 describes a soil release polymer which has ethylene glycol terephthalic groups and polyethylene glycol terephthalic groups.

In addition, modified celluloses, such as methylcellulose, hydroxypropylcellulose or carboxymethylcellulose, have been employed. U.S. Pat. No. 4,138,352 describes the combination of a nonionic reactant and a hydroxybutylated methylcellulose with low molecular weight as soil release agent.

EP-A1-0 042 187 describes detergent compositions which contain small amounts of substituted polyamines. The polyamines are in this case substituted by a longchain alkyl or alkenyl radical. They may additionally be substituted by at least two alkylene oxide residues on different nitrogen atoms. The compositions show in particular improved soil release properties.

It is an object of the present invention to provide soil release agents for detergents and cleaners which preferably also act as enzyme stabilizers and have an advantageous property profile.

We have found that this object is achieved by the use of crosslinked nitrogenous compounds which are soluble or dispersible in water and are obtainable by crosslinking of
  (a) compounds containing at least three NH groups with
  (b) at least bifunctional crosslinkers which react with NH groups,
in detergents and cleaners.

The NH groups can be present in primary ($NH_2$) and/or (NH) amino groups.

The nirogenous compounds according to the invention are preferably used as soil release agents and/or enzyme stabilizers.

The soil release effect presumably derives from the adsorption, described above, of the agent from the wash liquor onto the textile. The soil release effect thus emerges on washing several times. It must be distinguished from the single wash cycle or soil removal effect. The soil removal effect relates to detachment of soil directly on the first wash of a stained, non-pretreated fabric. Polyamines ethoxylated with ethylene oxide often show a single wash cycle or soil removal effect. It has been found, surprisingly, that oligo- and polyamines crosslinked in particular by polyether chains show soil release properties. The additional enzyme-stabilizing effect was unexpected because the stabilizing additives employed to date have been mainly boric acid derivatives with polyols and alkyl- or arylboronic acids.

The compounds employed according to the invention moreover show the advantageous properties in a large number of detergent formulations, such as heavy duty detergents, colored textile detergents, which can be in liquid or solid form.

Compounds (a)

The crosslinked nitrogenous compounds used according to the invention can be obtained by crosslinking of (a) compounds containing at least three NH groups. Compounds (a) are preferably selected from oligo- and polyamines, polyalkylenepolyamines, polyamidoamines, polyamidoamines grafted with (poly)ethyleneimine, and mixtures thereof Polyallylenepolyamines are suitable as component (a). Polyalkylenepolyamines mean in the present connection compounds which contain at least three NH groups, eg. diethylene triamine, triethylenetetramine, tetraethylenepentamine, pentaethylenehexamine, diaminopropylethylenediamine, trisaminopropylamine and polyethyleneimines. The polyethyleneimines preferably have an average molecular weight (Mw) of at least 300. The average molecular weight of the polyethyleneimines may be up to 1,000,000. Of particular interest industrially is the use of polyethyleneimines with average molecular weights of from 600 to 25,000.

Also preferred are polyethyleneimine homopolymers with a degree of polymerization n of 5, 6, 10, 20, 35 and 100.

These polyethyleneiminehomopolymers may be prepared either water-containing or anhydrous, or be dehydrated. Synthesis of appropriate polyethyleneimines is described in the examples.

The polyethyleneimines ray also be partly modified, for example in one embodiment of the invention rendered hydrophobic with benzoic acid.

In one embodiment of the Invention, the polyalkylenepolyamine is selected from amines of the formula (I)

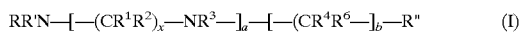

where the radicals R, R' and R", $R^1$, $R^2$, $R^4$ and $R^5$ are, independently of one another, hydrogen atoms, linear or branched-chain $C_{1-20}$-alkyl -alkoxy, -hydroxyalkyl, -(alkyl)-carboxyl, -alcylamino radicals, $C_{2-20}$-alkenyl radicals or $C_{6-20}$-aryl, -aryloxy, -hydroxyaryl, -arylcarboxyl or -arylaino radicals, which may be further substituted, the radicals $R^3$ and $R^6$ are, independently of one another, hydrogen atoms, linear or branched-chain $C_{1-20}$-alkyl radicals, $C_{6-20}$-aryl radicals, which are unsubstituted or substituted, or radicals $[(CR^7R^8)_2—NR^9]_c—R^{10}$, where the radicals $R^7$, $R^8$, $R^9$ and $R^{10}$ are defined, independently of one another, as above for R, R', R", $R^1$, $R^2$, $R^4$, $R^5$, or are carboxymethyl, carboxyethyl, phosphonomethyl or carbamoylethyl radicals, x, y and z are, independently of one another, 2, 3 or 4, and a, b and c are, independently of one another, integers from 0–300, there being at least three NH groups in the molecule.

5 to 100%, in particular 10 to 95%, of the nitrogen atoms in the above amines are preferably present in primary or secondary amino groups.

In one embodiment of the invention, the above amines have a number average molecular weight of from 80 to 150,000, preferably 100 to 50,000, particularly preferably 110 to 10,000, especially 129 to 5000.

The amine or polyalkylenepolyamine of the formula (I) may be a block copolymer or, in one embodiment of the invention, a polymer with randomly distributed blocks or a polymer with an overall random distribution.

Further suitable compounds (a) are polyamidoamines. They are obtained, for example, by reacting dicarboxylic acids having 4 to 10 carbon atoms with polyalkylenepolyamines preferably containing 3 to 20 basic nitrogen atoms in the molecule. The reaction products should have at least three NH groups. Examples of suitable dicarboxylic acids are succinic acid, maleic acid, adipic acid, glutaric acid, suberic acid, sebacic acid or terephthalic acid. Mixtures of carboxylic acids can also be employed, eg. mixtures of adipic acid and glutaric acid or maleic acid and adipic acid or technical dicarboxylic acid mixtures such as Sokolan® DCS from BASF AG. Adipic acid or Sokolan® DCS is preferably used to prepare the polyamidoamines. Suitable polyalkylenepolyamines condensed with the dicarboxylic acids have been mentioned above, eg. diethylenetriamine, triethylenetetramine, dipropylenetriamine, tripropylenetetramine, dihexamethylenetriamine, aminopropylethylenediamine and bisaminopropylethylenediamine. The polyalkylenepolyamines can also be employed in the form of mixtures for preparing the polyamidoamines. The polyamidoamines are preferably prepared without diluent, but this can also take place in inert solvents where appropriate. The dicarboxylic acids are condensed with the polyalkylenepolyamines at elevated temperatures, eg. in the range from 100 to 220° C. The water formed in the reaction is distilled out of the reaction mixture. The condensation can, where appropriate, also be carried out in the presence of lactones or lactams of carboxylic acids having 4 to 8 carbon atoms. From 0.8 to 1.4 mol of a polyalkylenepolyamine are normally used per mole of dicarboxylic acid. The polyamidoamines obtainable in this way have primary and secondary amino groups, contain tertiary nitrogen atoms and are soluble in water.

Also suitable as component (a) are polyamidoamines grafted with ethyleneimine. Products of this type can be prepared by allowing ethyleneimine to act on the polyamidoamines described above in the presence of acids or Lewis acids, eg. sulfuric acid, phosphoric acid or boron trifluoride etherate. Ethyleneimine is grafted onto the polyamidoamine under the conditions described. It is possible, for example, to graft from 1 to 20 ethyleneimine units on for each basic nitrogen group in the polyamidoamine, ie. about 10–1000, preferably 3–500, parts by weight of ethyleneimine are employed per 100 parts by weight of a polyamidoamine.

The polyalkylenepolyamines described above may be partially amidated. Products of this type are prepared, for example, by reacting polyalkylenepolyamines with monocarboxylic acids or esters of monobasic carboxylic acids and monohydric $C_1$–$C_4$-alcohols. The polyalkylenepolyamines are preferably 1–30, usually only up to 20%, amidated for the subsequent reactions. The amidated polyalkylenepolyamines must still have at least three free NH groups so that they can be reacted with the crosslinkers (b). Monocarboxylic acids having 1 to 28 carbon atoms can be employed for amidating the polyalkylenepolyamines for example. Examples of suitable carboxylic acids are formic acid, acetic acid, propionic acid, benzoic acid, salicylic acid, lauric acid, palmitic acid, stearic acid, oleic acid, linoleic acid and behenic acid, and naturally occurring mixtures of fatty acids such as coconut fatty acid. Amidation can be carried out, for example, by reacting the polyalkylenepolyamines with alkyldiketenes.

The polyalkylenepolyamines can also be used in partially quaternized form as compounds of group (a). Examples of suitable quaterning agents are alkyl halides such as methyl chloride, ethyl chloride, butyl chloride, epichlorohydrin, hexyl chloride and benzyl chloride, and dimethyl sulfate and diethyl sulfate. If quaternized polyalkylene polyamines are employed as compound of group (a), the degree of quaternization is preferably 1 to 30, normally only up to 20% so that sufficient free NH groups are available for reaction with the crosslinker (b).

Compounds of group (a) which are preferably used are polyethyleneimines with an average molecular weight of from 300 to 25,000, preferably 300 to 3000, and polyamidoamines grafted with ethyleneimine.

It is likewise possible to use according to the invention polymers (a) which contain repeating units of the following formula:

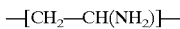

These mean, in particular, oligo/polyvinylformamides and copolymers of vinylformamide in which the formamide groups are at least partly, preferably 5–100 mol %, convened into amino groups by hydrolysis. Oligo/polyvinylformamides in which the formamide groups have been 20–100 mol %, in particular 40–100 mol %, convened into amino groups by hydrolysis are preferably employed. The hydrolysis can be carried out either in alkaline or in acidic medium.

In one embodiment of the invention, these polymers have a number average molecular weight of from 80 to 150,000, preferably 100 to 50,000, particularly preferably 110 to 10,000, especially 129 to 5000.

The amines or polyamines used according to the invention are prepared by known processes.

In one embodiment of the invention, component (a) is selected from amines of the formula (II)

$(R^1R^1)N-X-N(R^1R^1)$ (II)

where the radicals $R^1$ are hydrogen atoms or $(R^2R^2)N(CH)^2_n-$ radicals, the radicals $R^2$ are hydrogen atoms or $(R^3R^3)N-(CH_2)_n-$ radicals, the radicals $R^3$ are hydrogen atoms or $(R^4R^4)N-(CH_2)_n-$ radicals, the radicals $R^4$ are hydrogen atoms or $(R^5R^5)N-(CH_2)_n-$ radicals, the radicals $R^5$ are hydrogen atoms or $(R^6R^6)N-(CH_2)_n-$ radicals, the radicals $R^6$ are hydrogen atoms, n is 2, 3 or 4, and the radical X is one of the radicals

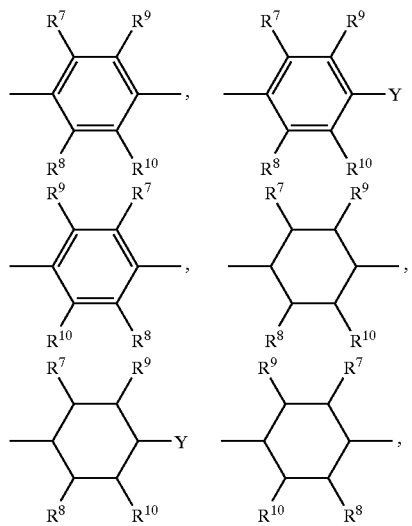

$-(CH_2)_p-$, $-(CH_2)_3-NR^{11}-(CH_2)_3-$, $-(CH_2)_1-[O-(CH_2)_k]_m-O-(CH_2)_1-C_{2-20}$-akylene, the radical Y is an oxygen atom, a $CR^7R^9C=O$ or $SO_2$ radical, p is an integer from 2–20, l and k are, independently of one another, an integer from 2–6, m is an integer from 1–40, the radicals $R^7$, $R^8$, $R^9$ and $R^{10}$ are, independently of one another, hydrogen atoms or $C_{1-6}$-alkyl radicals, and the radical $R^{11}$ is $C_{1-20}$-alkyl, $C_{2-20}$-dialkylamino-$C_{2-10}$-alkyl, $C_{1-10}$-alkoxy-$C_{2-10}$-alkyl, $C_{2-20}$-hydroxyalkyl, $C_{3-12}$-cycloalkyl, $C_{4-20}$-cycloalkylalkyl, $C_{2-20}$-alkenyl, $C_{4-30}$-dialkylaminoalkenyl, $C_{3-30}$-alkoxyalkenyl, $C_{3-20}$-hydroxyalkenyl, $C_{5-20}$-cycloalkylalkenyl, an aryl or a $C_{7-20}$-arylalkyl radical which is unsubstituted or substituted one to five times by $C_{1-8}$-alkyl, $C_{2-8}$-dialkylamino, $C_{1-8}$-alkoxy, hydroxyl, $C_{3-8}$-cycloalkyl and/or $C_{4-12}$-cycloalkylalkyl, or two radicals $R^{11}$ together form an alkylene chain which may be interrupted by nitrogen or oxygen, such as from ethylene oxide, propylene oxide, butylene oxide and $-CH_2-CH(CH_3)-O-$ or polyisobutylene with 1 to 100 isobutylene units, where 5–100% of the nitrogen atoms are in primary or secondary amino groups.

The radicals $R^7$, $R^8$, $R^9$, $R^{10}$ in the formula II are $C_{1-6}$-alkyl radicals, preferably $C_{1-3}$-alkyl radicals, such as methyl, ethyl, n-propyl and isopropyl radicals, particularly preferably methyl and ethyl radicals, especially methyl radicals, or preferably hydrogen, with the radicals $R^7$ and $R^8$, and $R^9$ and $R^{10}$, preferably being identical.

Examples of radicals $R^{11}$ according to the invention are $C_{1-20}$-alkyl radicals, preferably $C_{1-12}$-alkyl radicals such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, n-hexyl, isohexyl, sec-hexyl, n-heptyl isoheptyl, n-octyl isooctyl, n-nonyl, isononyl, n-decyl, isodecyl, n-undecyl, isoundecyl, n-dodecyl and isododecyl radicals, particularly preferably $C_{1-4}$-alkyl radicals such as methyl, ethyl, n-propyl, isopropyl, n-butyl, isobutyl, sec-butyl and tert-butyl radicals, aryl radicals such as phenyl, 1-naphthyl and 2-naphthyl radicals, preferably phenyl radicals, $C_{7-20}$-aryl radicals, preferably $C_{7-12}$-phenylalkyl radicals, such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl radicals, particularly preferably benzyl 1-phenethyl and 2-phenethyl radicals, $C_{7-20}$-alkylaryl radicals, preferably $C_{7-12}$-alkylphenyl radicals such as 2-methylphenyl, 3-methylphenyl 4-methylphenyl, 2,4-dimethylphenyl, 2,5-dimethylphenyl, 2,6-dimethylphenyl, 3,4-dimethylphenyl, 3,5-methylphenyl, 2,3,4-trimethylphenyl, 2,3,5-trimethylphenyl, 2,3,6-trimethylphenyl, 2,4,6-trimethylphenyl, 2-ethylphenyl, 3-ethylphenyl, 4-ethylphenyl, 2-i-propylphenyl, 3-n-propylphenyl and 4-n-propylphenyl radicals or polyisobutylene radicals with 1–100, preferably 1–70, particularly preferably 1–50, isobutylene units.

The amines of the formula (II) are preferably prepared by the process described in WO 96/15097.

They are preferably prepared from diamines of the formula $NH_2-(CH_2)_n-NH_2$ where n is an integer from 2 to 20. Examples of suitable diamines of this type are 1,2-ethylene-diamine, 1,3-propylenediamine, 1,4-butylenediamine and 1,6-hexamethylenediamine. Primary tetraaminoalkylalkylenediamines are likewise preferably employed, such as N,N,N',N'-tetraaminopropyl-1,2-ethylenediamine, N,N,N',N'-tetraaminopropyl-1,3-propylenediamine, N,N,N',N'-tetraaminopropyl-1,4-butylenediamine and N,N,N',N'-tetraaminopropyl-1,6-hexamethylenediamine.

Preferred examples of amines (II) according to the invention, which are also referred to as dendrimeric amines, and their precursors, are N,N,N',N'-tetraaminopropylethylenediamine, refereed to as N6-amine hereinafter, and the dendrimeric amines which can be prepared therefrom by aminopropylation and are referred to by the number of their nitrogen atoms, such as N14, N30, N62 and N126 amine from BASF AG. These amines have a basic ethylenediamine framework in which the hydrogen atoms on the nitrogen are replaced by amino(n-propyl)radicals. The terminal amino groups may in turn be substituted by corresponding aminopropyl groups (N14 amine) etc. Processes for preparing these amines are described in WO 96/15097, starting from ethylenediamine. Likewise preferred examples of these amines according to the invention are corresponding N amines as described in WO 93/14147, which are prepared starting from butylenediamine instead of ethylenediamine as above. Amines of this type are prepared and marketed by DsM N.V. in the Netherlands.

Further components (a) which are preferred according to the invention are polyamines of the following formula

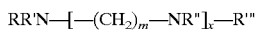

where the radicals R, R' or R" are, independently of one another, hydrogen atoms, $C_{1-10}$-alkyl radicals, $C_{2-20}$-alkenyl radicals or $C_{6-20}$-aryl radicals, the radical R'" is a hydrogen atom or a —$(CH_2)_o$—[NH—$(CH_2)_m$—]$_p$—$NH_2$ radical or a hydroxyalkyl or alkoxy radical, where x is an integer from 1–10, m is an integer from 2–4, o is an integer from 2–4, and p is an integer from 0–10.

Particularly preferred amines are those of the following formula $$H_2N—[—(CH_2)_mNH0]_x—H$$

where m is 2, 3 or 4 and x is an integer from 1–10,

where the radicals R and R' are, independently of one another $C_{1-20}$-alkyl radicals, $C_{2-20}$-alkenyl radicals or $C_{6-20}$-aryl radicals, m is 2, 3 or 4, and x is an integer from 1–10,

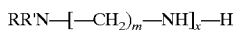

where the radical R is a hydrogen atom or a $C_{1-20}$-alkyl radical, $C_{2-20}$-alkenyl radical or $C_{6-20}$-aryl radical,

where m is 2, 3 or 4, o is 2, 3 or 4, x is an integer from 0–10, p is an integer from 0–10, and the total of x and p is ≧1.

Preferred compounds (a) are N,N,N',N'-tetraaminopropyl-1,2-ethylenediamine or polyethyleneimine with a degree of polymerization of from 5 to 500, preferably from 5 to 50.

Crosslinkers (b)

The nitrogenous compounds described above are reacted with at least one at least bifunctional crosslinker which reacts with NH groups to give crosslinked nitrogenous compounds which are soluble or dispersible in water. Crosslinkers (b) are preferably selected from the group consisting of the halogen-free crosslinkers (1) polyepoxides (2) ethylene carbonate, propylene carbonate and/or urea, (3) monoethylenically unsaturated carboxylic acids and their esters, amides and anhydrides, at least dibasic carboxylic acids or polycarboxylic acids, and their esters, amides and anhydrides, (4) products of the reaction of polyetherdiamines, alkylenediamines, polyalkylene-polyamines, bifunctional or multifunctional alcohols, alkylene glycols, polyalkylene glycols, functionalized polyesters or polyamides or their mixtures with monoethylenically unsaturated carboxylic acids or their esters, amides or anhydrides, the reaction products having at least two ethylenic double bonds, carboxaride, carboxyl or ester groups as functional groups, (5) products, containing at least two aziridino groups, of the reaction of dicarboxylic esters with ethyleneimine, (6) cumulenes and polyheterocumulenes, (7) β-keto esters, β-keto acids and β-keto aldehydes, (8) functionalized glycidyl ethers, the halogen-containing crosslinkers (9) polyhalides

(10) glycidyl halides,

(11) chloroformates and chloroacetic acid derivatives,

(12) epichlorohydrin, glycerol chlorohydrin, polyether dichlorohydrin compounds,

(13) phosgene or mixtures thereof.

Examples of polyepoxides (1) are polyalkylene glycol bisglycidyl ethers which are prepared from bischlorohydrins such as bischlorohydrins of polyethylene glycols under alkaline conditions. The alkylene glycols preferably have 2 to 10 carbon atoms, and are, in particular, ethylene glycol, 1-methylethylene glycol or 1-ethylethylene glycol.

It is likewise possible to use alkanediol bisglycidyl ethers, preferably of a $C_{2-12}$-alkanediol which is, in particular, linear. Examples are butanediol bisglycidyl ether and hexanediol bisglycidyl ether.

It is additionally possible to use aryl bisglycidyl ethers and cyclic alkyl bisglycidyl ethers which are derived, in particular, from benzene nuclei or dimethylcyclohexane nuclei, which may in turn be substituted. It is likewise possible to use bisepoxides such as bis-ethylene oxide and ethylene oxide units which are separated by a linear $C_{1-12}$-alkylene radical.

Preferably employed from group (2), ethylene carbonate, propylene carbonate and/or urea, is propylene carbonate.

Monoethylenically unsaturated carboxylic acids and their esters, amides and anhydrides from group (3) are, for example, acrylic acid, methacrylic acid, crotonic acid, acrylates or acrylamides from primary or secondary amines. The alcohol residue has in this case 1 to 22, preferably 1 to 18, carbon atoms, and the amine residue 0 to 12 carbon atoms. At least dibasic carboxylic acids or polycarboxylic acids can be either saturated or unsaturated. Examples are tartaric acid and its analogs, and $C_{2-50}$-dicarboxylic acids, in particular linear $C_{2-20}$-alkylenedicarboxylic acids, and their esters, amides or anhydrides. Esters or diesters can be formed with $C_{1-22}$-alcohols, and amides and diamides may have $C_{1-22}$ radicals.

Examples of suitable dicarboxylic esters are dimethyl oxalate, diethyl oxalate, diisopropyl oxalate, dimethyl succinate, diethyl succinate, diisopropyl succinate, di-n-propyl succinate, diisobutyl succinate, dimethyl adipate, diethyl adipate and diisopropyl adipate.

Examples of unsaturated acids are maleic acid, itaconic acid and their anhydrides or esters.

Examples of polycarboxylic acids are citric acid, propanetricarboxylic acid, ethylenediaminetetraacetic acid, butanetetracarboxylic acid, and higer polycarboxylic acids. It is also possible to use polymers of methacrylic acid, maleic acid, itaconic acid or mixtures thereof It is also possible to employ copolymers with $C_{2-30}$-olefins, such as copolymers of maleic anhydride and isobutene or diisobutene. The anhydride groups may moreover be converted into esters or amides. Examples of suitable polymers are described in EP-A 0 276 464, U.S. Pat. No. 3,810,834, GB-A 1 411 063 and U.S. Pat. No. 4,818,795.

It is furthermore possible to employ salts of all the acids mentioned.

Examples of group (4) are polyetherdiacrylic acid, -diacrylic esters and -diacrylamides, for example compounds which have 1 to 50 ethylene oxide units and in which the alcohol residue in the ester has 1 to 22 carbon atoms, and the amides which can be formed from ammonia, primary or secondary amines with $C_{1-22}$ radicals. Other examples are ethylenediaminediacrylates and polyetherdiaminediacrylates. The alcohol residues in the acrylates once again have 1 to 22 carbon atoms, and the polyether portion can have 0 to 50 repeating units. Apart from ethylene oxide units, the polyether block can also be composed of propylene oxide units or THF units. One example is a poly-THF-diaminediacrylate or -acrylamide or acrylic acid. The amine functionalities may also be derived from the amines mentioned at the outset.

The acrylate groups are in this case bonded to the amine groups by Michael addition. They may also be linked by amide formation with the amine groups of the polyether diamines, so that the molecules have two ethylenically unsaturated groups. Poly-THF-diacrylamides can be used correspondingly. It is furthermore possible to use polyiminedi- and -polyacrylates in which two or more NH groups are added onto acrylates by Michael additions. It is possible to use correspondingly polyaminediacrylates and polyimine-MA-monoamides or polyamine-MA-monoamides. In these cases, the terminal amino groups in the polymine or polyamine are in each case reacted with one molecule of maleic anhydride (MA) to give the corresponding monoamides. The remaining acid functionalities in the maleic acid can in this case be replaced by esters or amides. It is likewise possible to use a polyether diamine dimaleic monoamide, ie. a polyetherdiamine whose two terminal amino groups have each been reacted with one maleic anhydride molecule to give an amide. The remaining acid functionalities of the maleic anhydride may likewise be in the form of esters or amides. The polyether diamines, polyimines or polyamines preferably have 5 to 50 repeating units.

The resulting products should in general have at least two ethylenic double bonds, carboxamide, carboxyl or ester groups as functional groups. Products of the reactions of amines or glycols with maleic anhydride, such as alkylene glycols, polyethylene glycols, polyethyleneimines or polypropyleneimines preferably have molecular weights in the range from 400 to 100,000. Products of the reaction of maleic anhydride with $\alpha,\omega$-polyethyleneimines with a molecular weight of from 400 to 5000, products of the reaction of polyethyleneimines with a molecular weight of from 129 to 50,000 with maleic anhydride, and products of the reaction of ethylenediamine or triethylenetetramine with maleic anhydride in the molar ratio not exceeding 1:2 are particularly preferred. The polyetherdiamines, alkylenediamines and polyalkylenepolyamines can also be reacted with maleic anhydride in a Michael addition.

Examples of compounds of group (5) are products of the reaction of $C_{2-50}$-dicarboxylic acids, especially linear alkylenedicarboxylic acids, with ethyleneimine. One example is $\alpha$-1-aziridinoethyloxamide.

Examples of cumulenes and polyheterocumulenes of group (6) are 2,6-tolylene diisocyanate, 2,4-tolylene diisocyanate and compounds of the formulae O=C=N—X—N=C⊙O and S=C=N—X—N=C=S, where X is a $C_{1-22}$-alkylene radical or $C_{6-20}$-arylene radical.

$\beta$-Keto esters, $\beta$-keto acids and $\beta$-keto aldehydes (7) may have the formula $R^1$—C(=O) $CR^2R^3$—C(=O)—$R^4$ where the radicals $R^1$ to $R^3$ can be hydrogen atoms or $C_{1-12}$-alkyl radicals, and R' can be hydrogen, OH or a $C_{1-22}$-alkoxy radical.

Examples of functionalized glycidyl ethers (8) are glycidyl acrylate or 2-propenyl glycidyl ether Examples of halogen-containing crosslinkers are polyhalides (9) such as linear $C_{1-10}$-alkylene dichlorides, such as dichloromethane or 1,2-dichloromethane. The polyhalides may also be derived from polyethylene oxides or ethylene oxides substituted by methyl or ethyl radicals. They may likewise be present in poly-THF molecules, in which case the halides are at the ends of the polymer chain. It is moreover possible to use random polymers or block copolymers of corresponding polyethers which have two halogen atoms. The weight average molecular weight is preferably 300 to 3000.

Glycidyl halides (10) which can be used are epichlorohydrin and glycidyl ethers of haloalkanes or aromatic halogen compounds. The halogen atoms of the crosslinkers (9) and (10) and of the following crosslinkers are preferably chlorine atoms or bromine atoms, in particular chlorine atoms.

Glycerol chlorohydrin and polyether dichlorohydrin compounds (12) are prepared from epichlorohydrin and the appropriate alcohols, ie. glycerol or polyethylene glycols. The polymeric crosslinkers generally have a weight average molecular weight of from 100 to 10,000, preferably 300 to 3000. Particularly preferred crosslinkers are bischlorohydrins and biselycidyl ethers of polyethylene glycols. The bisglycidyl ethers can be prepared under alkaline conditions.

Preparation of the Crosslinked Nitrogenous Compounds

The water-soluble reaction products according to the invention can be obtained by reacting the compounds of components (a) with the crosslinkers of component (b). The reaction is preferably carried out in aqueous medium. Condensation of components (a) and (b) is carried out, for example, at a temperature in the range from 0 to 200° C., preferably 20 to 160° C. If the condensation is carried out in an aqueous solution at temperatures above the boiling point of water, the reaction is undertaken in press tight apparatus. However, the condensation can also be carried out without diluent or in solvents which are inert to the reactants, such as high-boiling ethers (diethylene glycol dimethyl ether), tetrahydrofuran, polyols, toluene, xylens, other high-boiling substituted aromatic compounds or commercial hydrocarbon fractions boiling in the range from 50 to 300° C. In the case of condensation in aqueous solution, the pH of the reaction mixture is, for example, 2 to 12, preferably 5 to 11. In most cases, condensation is carried out at the pH set up when the reactants dissolve in the water. The concentration of the resulting water-soluble condensates in the aqueous solution is, for example, 10 to 90% by weight and is preferably in the range from 20 to 80% by weight. The reaction products are regarded as soluble in water when they are able to form a solution with a strength of at least 5% by weight in water at room temperature. Condensation of the compounds of components (a) and (b) is preferably carried out in aqueous solution so as to result in water-soluble condensates which, in a 20% by weight aqueous solution at 20° C., have a viscosity of at least 100 mPas, preferably 100 to 15,000 mPas (measured at pH 7 in a Brookfield viscometer).

The mixtures reacted in the condensation contain from 50 to 99.9% by weight, preferably 60 to 99.5% by weight, of at least one compound of component (a) and from 0.1 to 50% by weight, preferably 0.5 to 40% by weight, of at least one compound of component (b), with the total of components (a) and (b) always being 100% by weight.

The result, especially when oligoamines or polyamines and bisfunctionalized polyethylene glycol blocks are used, is, depending on the reaction conditions and molar ratio, a polymer with a network structure consisting of amine and polyethylene glycol blocks of defined size, chain length and molecular weight distribution. The compounds according to the invention improve the detachment of soil in the washing of textiles on the one hand due to the soil release properties, and on the other hand due to the enzyme-stabilizing effect, which increases the activity of the enzymes. Enzymes present in modern detergents, such as proteases, lipases, cellulases, amylases and peroxidases, which are used to improve the detergency performance, are exposed to destabilizing and inactivating conditions in the detergent formulation. These conditions may be caused by various ingredients in the formulation, such as the suit system, the bleach system, the alkalis etc. This problem is common in liquid detergent formulations in particular, because the enzymes are not protected from contact owing to the mobility of the detergent ingredients. In this case, the crosslinked compounds according to the invention result in a stabilization and retention of the enzymes, which are thus able to display their full effect in the washing process.

Addition of even small amounts of the crosslinked nitrogenous compounds according to the invention, especially the crosslinked polyamines, improves the soil-releasing properties of color detergent, heavy duty detergent or compact detergent formulations. The compounds according to the invention are probably adsorbed from the wash liquor onto the textiles. When a textile treated in this way is soiled, the compounds applied to the textile result in a distinctly improved detachment of soil in the subsequent wash. The compounds according to the invention are particularly effective for stains consisting of a combination of fatty or oily soil and pigment particles, for example stains consisting of used engine oil, lipstick, makeup or shoe cream. The compounds are particularly advantageous for cleaning polyester fabrics or polyester-containing fabrics.

The invention thus also relates to detergents and cleaners comprising at least one crosslinked nitrogenous compound as defined above, and at least one surfactant. The detergent and cleaner preferably comprises at least one enzyme in addition.

These detergents can be used according to the invention for washing textiles.

The detergents according to the invention may furthermore comprise the ingredients conventionally used in detergents, such as builders, surfactants, bleaches, enzymes and other ingredients as described hereinafter.

Builders

Inorganic builders (A) suitable for combination with the (polyalkylenepoly)amines according to the invention are, in particular, crystalline or amorphous aluminosilicates with ion-exchanging properties such as, in particular, zeolites. Various types of zeolites are suitable, in particular zeolites A, X, B, P, MAP and HS in their Na form or in forms in which Na is partly replaced by other cations such as Li, Ca, Mg or ammonium. Suitable zeolites are described, for example, in EP-A 038591, EP-A 021491, EP-A 087035, US-A 4604224, GB-A 2013259, EP-A 522726, EP-A 384070 and WO-A 94/24251.

Examples of suitable crystalline silicates (A) are disilicates or sheet silicates, eg. SKS-6 (manufactured by Hoechst AG). The silicates can be employed in the form of their alkali metal, alkaline earth metal or ammonium salts, preferably as Na, Li and Mg silicates.

Amorphous silicates such as sodium metasilicate with a polymeric structure, or Britesil® (manufactured by Akzo N.V. in the Netherlands) can likewise be used. Suitable carbonate-based inorganic builders are carbonates and bicarbonates. These can be employed in the form of their alkali metal, alkaline earth metal or ammonium salts.

Na, Li and Me carbonates and bicarbonates, especially sodium carbonate and/or sodium bicarbonate, are preferably employed.

Phosphates usual as inorganic builders are polyphosphates, eg. pentasodium triphosphate.

Said components (A) can be employed singly or in mixtures with one another. An inorganic builder component of particular interest is a mixture of aluminosilicates and carbonates, especially of zeolites, in particular zeolite A, and alkali metal carbonates, in particular sodium carbonate, in the ratio of from 98:2 to 20:80, in particular from 85:15 to 40:60, by weight. Other components (A) may also be present in addition to this mixture.

In a preferred embodiment, the textile detergent formulation according to the invention contains 0.1 to 20% by weight, in particular 1 to 12% by weight, of organic cobuilders (B) in the form of low molecular weight oligomeric or polymeric carboxylic acids, especially polycarboxylic acids, or phosphonic acids or their salts, in particular Na or K salts.

Examples of suitable low molecular weight carboxylic acids or phosphonic acids for (B) are:

$C_4$–$C_{20}$-di-, -tri- and -tetracarboxylic acids such as succinic acid, propanetricarboxylic acid, butanetetracarboxylic acid, cyclopentanetetracarboxylic acid and alkyl- and alkenylsuccinic acids with $C_2$–$C_{16}$-alkyl and -alkenyl radicals respectively;

$C_4$–$C_{20}$-hydroxy carboxylic acids such as malic acid, tartaric acid, gluconic acid, glutaric acid, citric acid, lactobionic acid and sucrosemono-, -di- and -tricarboxylic acids;

aminopolycarboxylic acids such as nitilotriacetic acid, β-alaminediacetic acid, ethylenediaminetetraacetic acid, serinediacetic acid, isoserinediacetic acid, methyl-glycinediacetic acid and alkylethylenediaminetriacetates;

salts of phosphonic acids such as hydroxyethanediphosphonic acid.

Examples of suitable oligomeric or polymeric carboxylic acids for (B) are:

Oligomaleic acids as described, for example, in EP-A 0 451 508 and EP-A 0 396 303;

co- and terpolymers of unsaturated $C_4$–$C_8$-dicarboxylic acids, possible comonomers being monoethylenicaly unsaturated monomers from group (i) in amounts of up to 95% by weight,
from group (ii) in amounts of up to 60% by weight and
from group (iii) in amounts of up to 20% by weight.

Examples of suitable unsaturated $C_4$–$C_8$-dicarboxylic acids in this case are maleic acid, fumaric acid, itaconic acid and citraconic acid. Maleic acid is preferred.

Group (i) comprises monoethylenically unsaturated $C_3$–$C_8$-monocarboxylic acids such as acrylic acid, methacrylic acid, crotonic acid and vinylacefic acid. Preferably employed from group (i) are acrylic acid and methacrylic acid.

Group (ii) comprises monoethylenically unsaturated $C_2$–$C_{22}$-olefins, vinyl alkyl ethers with $C_1$–$C_8$-alkyl groups, styrene, vinyl esters of $C_1$–$C_8$-carboxylic acids, (meth)-acrylamide and vinylpyrrolidone. Preferably employed from group (ii) are $C_2$–$C_6$-olefins, vinyl alkyl ethers with $C_1$–$C_4$-alkyl groups, vinyl acetate and vinyl propionate.

Group (iii) comprises (meth)acrylic esters of $C_1$–$C_8$-alcohols, (meth)acrylonitrile, (methacrylamides of $C_1$–$C_8$-amines, N-vinylformamide and vinylimidazole.

If the group (ii) polymers contain vinyl ester units, these can also be partly or completely hydrolyzed to vinyl alcohol structural units. Suitable co- and terpolymers are disclosed, for example, in U.S. Pat. No. 3,887,806 and DE-A 43 13 909.

Suitable and preferred copolymers of dicarboxylic acids for component (B) are:

copolymers of maleic acid and acetic acid in the ratio 100:90 to 95:5 by weight, particularly preferably those in the ratio 30:70 to 90:10 by weight, with molecular weights of from 100,000 to 150,000:

terpolymers of maleic acid, acrylic acid and a vinyl ester of a $C_1$–$C_3$-carboxylic acid in the ratio 10 (maleic acid):90 (acrylic acid+vinyl ester) to 95 (maleic acid) :10 (acrylic acid+vinyl ester) by weight, it being possible for the ratio of acrylic acid to the vinyl ester to vary in the range from 30:70 to 70:30 by weight;

copolymers of maleic acid with $C_2$–$C_8$-olefins in the molar ratio 40:60 to 80:20, with copolymers of maleic acid with ethylene, propylene or isobutylene in the molar ratio 50:50 being particularly preferred.

Graft copolymers of unsaturated carboxylic acids on low molecular weight carbohydrates or hydrogenated carbohydrates, cf. U.S. Pat. No. 5,227,446, DE-A 44 15 623 and DE-A 43 13 909, are likewise suitable as component (B).

Examples of suitable unsaturated carboxylic acids in this case are maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% of the weight of the component to be grafted.

It is additionally possible for up to 30% by weight, based on the component to be grafted, of other monoethylenically unsaturated monomer units to be present in the polymer for modification. Suitable modifying monomers are the above-mentioned monomers of groups (ii) and (iii).

Suitable as grafting base are degraded polysaccharides such as acidically or enzymatically degraded starches, inulins or cellulose, protein hydrolysates and reduced (hydrogenated or reductively aminated) degraded polysaccharides such as mannitol, sorbitol, aminosorbitol and N-alkylglucamine, and polyalkylene glycols with molecular weights of up to Mw=5000, such as polyethylene glycols, ethylene oxide/propylene oxide or ethylene oxidelbutylene oxide or ethylene oxide/propylene oxidelbutylene oxide block copolymers and alkoxylated monohydric or polyhydric $C_1$–$C_{22}$-alcohols, cf. U.S. Pat. No. 5,756,456.

Preferably employed from this group are strayed degraded or degraded reduced starches and grafted polyethylene oxides, employing 20 to 80% by weight of monomers based on the grafting component in the graft copolymerization. A mixture of maleic acid and acrylic acid in the ratio from 90:10 to 10:90 by weight is preferably employed for the grafting.

Polyglyoxylic acids suitable as component (B) are described, for example, in EP-B 0 001 004, U.S. Pat. No. 5,399,286, DE-A 41 06 355 ad EP-A 0 656 914. The endgroups of the polyglyoxylic acids may have different structures.

Polyamidocarboxylic acids and modified polyamidocarboxylic acids suitable as component (B) are disclosed, for example, in EP-A 0 454 126, EP-B 0 511 037, WO-A 94/01486 and EP-A 0 581 452.

Also particularly used as component (B) are polyaspartic acids or cocondensates of aspartic acid with other amino acids, $C_4$–$C_{25}$-mono- or -dicarboxylic acids and/or $C_4$–$C_{25}$-mono- or diamines. Particularly preferably employed are polyaspartic acids prepared in phosphorus-containing acids and modified with $C_6$–$C_{22}$-mono- or dicarboxylic acids or with $C_6$–$C_{22}$-mono or diamines.

Condensates of citric acid with hydroxy carboxylic acids or polyhydroxy compounds suitable as component (B) are disclosed, for example, in WO-A 93/22362 and WO-A 92/16493. Carboxyl-containing condensates of this type normally have molecular weights of up to 10,000, preferably up to 5000.

Also suitable as component (B) are ethylenediaminedisuccinic acid, oxydisuccinic acid, aminopolycarboxylates, aminopolyalkylenephosphonates and polyglutamates.

Oxidized starches can also be used as organic cobuilders in addition to component (B).

Surfactants

Suitable anionic surfactants (C) are, for example, fatty alcohol sulfites of fatty alcohols with 8 to 22, preferably 10 to 18, carbon atoms, eg. $C_9$–$C_{11}$-alcohol sulfates, $C_{12}$–$C_{14}$-alcohol sulfates, cetyl sulfate, myistyl sulfate, palmityl sulfate, stearyl sulfate and tallow fatty alcohol sulfate.

Other suitable anionic surfactants are sulfated ethoxylated $C_8$–$C_{22}$-alcohols (alkyl ether sulfates) and their soluble salts. Compounds of this type are prepared, for example, by initially alkoxylating a $C_8$–$C_{22}$, preferably a $C_{10}$–$C_{11}$, alcohol eg. a fatty alcohol, and subsequently sulfating the alkoxylation product. Ethylene oxide is preferably used for the alkoxylation, in which case 2 to 50, preferably 3 to 20, mol of ethylene oxide are employed per mole of alcohol. However, the alcohols can also be alkoxylated with propylene oxide, alone or with butylene oxide. Also suitable are those alkoxylated $C_8$–$C_{22}$-alcohols which contain ethylene oxide and propylene oxide or ethylene oxide and butylene oxide or ethylene oxide and propylene oxide and butylene oxide. The alkoxy-related $C_8$–$C_{22}$-alcohols may contain the ethylene oxide, propylene oxide and butylene oxide units in the form of blocks or in random distribution. Alkyl ether sulfates with a wide or narrow alkylene oxide distribution can be obtained depending on the nature of the alkoxylation catalyst.

Other suitable anionic surfactants are alkanesulfonates such as $C_8$–$C_{24}$, preferably $C_{10}$–$C_{18}$, alkanesulfonates, and soaps such as the Na and K salts of $C_8$–$C_{24}$-carboxylic acids.

Further suitable anionic surfactants are linear $C_9$–$C_{20}$ alkylbenzenesulfonates (LAS) and -alkyltoluenesulfonates.

Also suitable as anionic surfactants (C) are $C_8$–$C_{24}$-olefinsulfonates and -disulfonates which may also represent mixtures of alkene—and hydroxyalkanesulfonates and— disulfonates, alkyl ester sulfonates, sulfonated polycarboxylic acids, alkylglycerol sulfonates, fatty acid glycerol ester sulfonates, alkylphenol polyglycol ether sulfates, paraffinsulfonates with about 20 to about 50 carbon atoms (based on paraffin or paraffin mixtures obtained from natural sources), alkyl phosphates, acylisethionates, acyltaurates, acylmethvitaurates, alkylsuccinic acids, alkenylsuccinic acids or their monoesters or monoamides, alkylsulfosuccinic acids or their amides, mono- and diesters of sulfosuccinic acids, acylsarcosinates, sulfated alkyl polyglucosides, alkylpolyglycol carboxylates and hydroxyalkylsarcosinates.

The anionic surfactants are added to the detergents preferably in the form of salts. Suitable cations in the salts are alkali metal ions such as sodium, potassium, lithium and ammonium ions, eg. hydroxyethylammonium, di(hydroxyethyl)ammonium and tri(hydroxyethyl) ammonium ions.

Component (C) is preferably present in the textile detergent formulation according to the invention in an amount of from 3 to 30% by weight, in particular 5 to 15% by weight. If linear $C_9$–$C_{20}$-alkylbenzinesulfonates LAS) are present, these are normally used in an amount of up to 10% by weight, in particular up to 8% by weight. It is possible to employ only one class of anionic surfactants alone, for example only fatty alcohol sulfates or only alkylbenzenesulfonates, but mixtures of various classes can also be used, eg. a mixture of fatty alcohol sulfates and alkylbenzenesulfonates. Mixtures of different species within individual classes of anionic surfactants may also be employed.

Examples of suitable nonionic surfactants (D) are alkoxylated $C_8$–$C_{22}$-alcohols such as fatty alcohol alkoxylates or oxoalcoholalkoxylates. The alkoxylation can be carried out with ethylene oxide, propylene oxide and/or butylene oxide. Surfactants which can be employed in this case are all alkoxylated alcohols which contain at least two molecules of an abovementioned alkylene oxide in the adduct. Once again, block copolymers of ethylene oxide, propylene oxide and/or butylene oxide are suitable, or adducts which contain said alkylene oxides in random distribution. From 2 to 50, preferably 3 to 20, mol of at least one alkylene oxide are used per mole of alcohol. Ethylene oxide is preferably employed as alkylene oxide. The alcohols preferably have 10 to 18 carbon atoms. Alkoxylates with a wide or narrow alkylene oxide distribution can be obtained depending on the nature of the alkoxylation catalyst.

Another class of suitable nonionic surfactants comprises alkylphenol alkoxylates such as alkylphenol ethoxylates with $C_6$–$C_{14}$-alkyl chains and 5 to 30 mol of alkylene oxide units.

Another class of nonionic surfactants comprises alkyl polyglucosides or hydroxyalkyl polyglucosides with 8 to 22, preferably 10 to 18, carbon atoms in the alkyl chain. These compounds usually contain 1 to 20, preferably 1.1 to 5, glucoside units.

Another class of nonionic surfactants comprises N-alkylglucamides with $C_6$–$C_{22}$-alkyl chains. Compounds of this type are obtained, for example, by acylation of reductively aminated sugars with appropriate long-chain carboxylic acid derivatives.

Also suitable as nonionic surfactants (D) are block copolymers of ethylene oxide, propylene oxide and/or butylene oxide (Pluronic® and Tetronic® brands of BASF AG), polyhydroxy or polyalkoxy fatty acid derivatives such as polyhydroxy fatty amides, N-alkoxy or N-aryloxy-polyhydroxy fatty amides, fatty amide ethoxylates, especially endgroup-capped and fatty alkanolamide alkoxylates.

Component (D) is preferably present in the textile detergent formulation according to the invention in an amount of from 1 to 20% by weight, in particular 3 to 12% by weight. It is possible to employ only one class of nonionic surfactants, in particular only alkoxylated $C_8$–$C_{22}$-alcohols, but mixtures of various classes can also be used. Mixtures of different species within the individual classes of nonionic surfactants can also be employed.

Since the balance between the types of surfactants mentioned is of significance for the activity of the detergent formulation according to the invention, the ratio by weight of anionic surfactants (C) to nonionic surfactants (D) is preferably from 95:5 to 20:80, in particular from 70:30 to 50:50.

The detergents according to the invention can furthermore also contain cationic surfactants (E).

Examples of suitable cationic surfactants are surface-active compounds containing ammonium groups, such as alkyldimethylammonium halides and compounds of the formula $$RR^1R^2R^3N^+X^+$$

where the radicals R to $R^3$ are alcyl, aryl, aikylalkoxy, arylalkoxy, hydroxyalkyl(alkoxy), hydroxyaryl(alkoxy) groups and X is a suitable anion.

The detergents according to the invention may also contain ampholytic surfactants (F), such as aliphatic derivatives of secondary or tertiary amines which contain in one of the side chains an anionic group, alkyldimethylamine oxides or alkyl- or alkoxymethylamine oxides.

Components (E) and (F) may comprise up to 25%, preferably 3–15%, in the detergent formulation.

Bleaches

In another preferred embodiment, the textile detergent formulation according to the invention additionally contains 0.5 to 30% by weight, in particular 5 to 27% by weight, especially 10 to 23% by weight, of bleach (G). Examples are alkali metal perborates or alkali metal carbonate perhydrates, especially the sodium salts.

One example of an organic peracid which can be used is peracetic acid, which is preferably used in commercial textile laundry or commercial cleaning.

Bleach or textile detergent compositions which can advantageously be used contain $C_{1-12}$-percarboxylic acids, $C_{8-16}$-dipercarboxylic acids, imidopercaproic acids, or aryl-dipercaproic acids. Preferred examples of acids which can be used are peracetic acid, linear or branched peroctanoic, -nonanoic, -decanoic or dodecanoic acids, diperdecanedioic and -dodecanedioic acids, mono- and diperphthalic acids, -isophthalic acids and -terephthalic acids, phthalimidopercaproic acid and terephthaloyldipercaproic acid. It is likewise possible to use polymeric peracids, for example those containing acrylic acid basic units in which a peroxy functionality is present. The percarboxylic acids can be used as free acids or as salts of the acids, preferably alkali metal or alkaline earth metal salts. These bleaches (G) may be used in combination with from 0 to 15% by weight, preferably 0.1 to 15% by weight, in particular 0.5 to 8% by weight, of bleach activators (H). The bleach (G) is (if present) employed in color detergents as a rule without bleach activator (H), otherwise bleach activators (H) are also usually present.

Suitable bleach activators (H) are:

polyacylated sugars, eg. pentaacetylglucose;

acyloxybenzenesulfonic acids and their alkali metal and alkaline earth metal salts, eg. sodium p-isononanoyloxybenzenesulfonate or sodium p-benzoyloxy-benzenesulfonate;

N,N-diacylated and N,N,N',N'-tetraacylated amines, eg. N,N,N',N'-tetraacetylmethylenediamine and ethylenediamine (TAED), N,N-diacetylamline, N,N,-diacetyl-p-toluidine or 1,3-diacylated hydantoins such as 1,3-diacetyl-5,5-dimethylhydantoin;

N-alkyl-N-sulfonylcarboxamides, eg. N-methyl-N-mesylacetamide or N-methyl-N-mesylbenzamide;

N-acylated cyclic hydrazides, acylated triazoles or urazoles, eg. monoacetylated maleic hydrazides;

O,N,N-trisubstituted hydroxylamines, eg. O-benzoyl-N,N-succinylhydroxylamine, or O-acetyl-N,N-succinylhydroxylamine or O,N,N-triacetylhydroxylamine, N,N-diacylsulfamides, eg. N,N'-dimethyl-N,N'-diacetylsulfamide or N,N'-diethyl-N,N'-dipropionylsulfamide;

triacylcyanurates, eg. triacetylcyanurate or tribenzoylcyanurate;

carboxylic anhydrides, eg. benzoic anhydride, m-chlorobenzoic anhydride or phthalic anhydride;

1,3-diacyl-4,5-diacyloxyimidazolines, eg. 1,3-diacetyl-4,5-diacetoxyimid-azoline;

tetraacetylglycoluril and tetrapropionylglycoluril;

diacylated 2,5-diketopiperazines, eg. 1,4-diacetyl-2,5-diketopiperazine, products of the acylation of propylenediurea and 2.2-dimethylpropylenediurea, eg. tetraacetylpropylenediurea;

α-acyloxypolyacyitalonanides, eg. α-acetoxy-N,N'diacetylmalonamide;

diacyldioxohexahydro-1,3,5-triazines, eg. 1,5-diacetyl-2,4-dioxohexahydro-1,3,5-triazine;

benzo(4H)-1,3-oxazin-4-ones with alkyl radicals, eg. methyl, or aromatic radicals, eg. phenyl, in position 2.

The described bleach system consisting of bleach and bleach activators may also contain bleach catalysts. Examples of suitable bleach catalysts are quaternized imines and sulfone imines which are described, for example, in U.S. Pat. No. 5,360,569 and EP-A 0 453 003. Particularly effective bleach catalysts are manganese complexes which are described, for example, in WO-A 94/21777. Compounds of this type are, if they are used, incorporated into the detergent formulations in amounts not exceeding 1.5% by weight, in particular up to 0.5% by weight. Bleach catalysts which can likewise be used are the amines described in the application filed at the same time as this application and entitled "Bleach boosters for bleach and textile detergent compositions".

Besides the described bleach system consisting of bleaches and bleach activators with or without bleach catalysts, the use of systems with enzymatic release of peroxide or of photoactivated bleach systems for the textile detergent formulation according to the invention is also conceivable.

Enzymes

In another preferred embodiment, the textile detergent formulation according to the invention additionally contains 0.05 to 4% by weight of enzymes (J). Enzymes which are preferably employed in detergents are proteases, amylases, lipases and cellulases. The amounts of enzymes added are preferably 0.1–1.5% by weight, in particular preferably 0.2 to 1.0% by weight, of the formulated enzyme. Examples of suitable proteases are Savinase and Esperase (manufactured by Novo Nordisk). An example of a suitable lipase is Lipolase (manufactured by Novo Nordisk). An example of a suitable cellulase is Celuzym (manufactured by Novo Nordisk). It is also possible to use peroxidases to activate the bleach system. Single enzymes or a combination of different enzymes can be employed. The textile detergent formulation may also contain enzyme stabilizers, eg. calcium propionate, sodium formate or boric acids or their salts, and/or oxidation inhibitors.

Other Ingredients

The textile detergent formulation according to the invention may, besides the main components (A) to (J) mentioned, also contain the following other conventional additives in the amounts customary for this purpose:

aritiredeposition agents and other soil release polymers

Suitable other soil release polymers and/or antiredeposition agents for detergents are, for example:

polyesters from polyethylene oxides with ethylene glycol and/or propylene glycol and aromatic dicarboxylic acids or aromatic and aliphatic dicarboxylic its acids;

polyesters from polyethylene oxides endgroup-capped at one end with dihydric and/or polyhydric alcohols and dicarboxylic acid.

Polyesters of this type are disclosed, for example, in U.S. Pat. No. 3,557,039, GB-A 1 154 730, EP-A-0 185 427, EP-A-0 241 984, EP-A0 241 985, EP-A-0 272 033 and U.S. Pat. No. 5,142,020.

Other suitable soil release polymers are amphiphilic graft or other copolymers of vinyl and/or acrylic esters on polyalkylene oxides (cf. U.S. Pat. No. 4,746,456, U.S. Pat. No. 4,846,995, DE-A-37 11 299, U.S. Pat. No. 4,904,408, U.S. Pat. No. 4,846,994 and U.S. Pat. No. 4,849,126), or modified celluloses such as methylcellulose, hydroxypropylcellulose or carboxymethylcellulose.

Color transfer inhibitors, for example homo- and copolymers of vinylpyrrolidone, of vinylimidazole, of vinyloxazolidone or of 4-vinylpyridine N-oxide with molecular weights of from 15,000 to 100,000, and crosslinked fine-particle polymers based on these monomers;

non-surfactant foam suppressants or foam inhibitors, for example organopolysiloxanes and their mixtures with microfine, possibly silanized silica, and paraffins, waxes, microcrystalline waxes and their mixtures with silanized silica;

complexing agents (also acting as organic cobuilders);

optical brighteners;

polyethylene glycols;

perfumes or fragrances;

bulking agents;

inorganic fillers, eg. sodium sulfate;

formulation aids;

solubility improvers;

opacifying and pearlescent agents;

dyes;

corrosion inhibitors;

peroxide stabilizers;

electrolytes.

The detergent formulation according to the invention is solid, ie. is normally in the form of a powder or granules, or an extrudate or tablet.

The powder or granular detergents according to the invention may contain up to 60% by weight of inorganic fillers. Sodium sulfate is normally used for this purpose. However, the detergents according to the invention preferably contain only up to 20% by weight, particularly preferably only up to 8% by weight, of fillers, especially in the case of compact or ultracompact detergents. The solid detergents according to the invention may have bulk densities varying in the range from 300 to 1300 g/l, in particular from 550 to 120 g/l. Modern compact detergents usually have high bulk densities and a granular structure. The processes customary in the industry can be employed for the required compaction of the detergents.

The detergent formulation according to the invention is produced and, where appropriate, formulated by conventional methods.

Typical compositions of compact heavy duty detergents and color detergents are indicated below (the percentage data hereinafter and in the examples are based on weight; the data in parentheses for the compositions are preferred ranges):

| Composition of compact heavy duty detergents (powder or granule form) | |
|---|---|
| 1–60% (8–30%) | of at least one anionic (C) and one nonionic surfactant (D) |
| 5–50% (10–45%) | of at least one inorganic builder (A) |
| 0.1–20% (0.5–15%) | of at least one organic cobuilder (B) |
| 5–30% (10–25%) | of an inorganic bleach (G) |
| 0.1–15% (1–8%) | of a bleach activator (G) |
| 0–1% (max. 0.5%) | of a bleach catalyst |
| 0.05–5% (0.2–2.5%) | of a color transfer inhibitor |
| 0.3–1.5% | of a soil release agent according to the invention |
| 0.1–4% (0.2–2%) | of enzyme or enzyme mixture (H) |

Other conventional additives: sodium sulfate, complexing agents, phosphonates, optical brighteners, perfume oils, foam suppressants, antirepostion agents, bleach stabilizers

| Composition of color detergents (powder or granule form) | |
|---|---|
| 3–50% (8–30%) | of at least one anionic (C) and one nonionic surfactant (D) |
| 10–60% (20–55%) | of at least one inorganic builder (A) |
| 0–15% (0–5%) | of an inorganic bleach (G) |
| 0.05%–5% (0.2–2.5%) | of a color transfer inhibitor |
| 0.1–20% (1–8%) | of at least one organic cobuilder (B) |
| 0.2–2% | of enzyme or enzyme mixture (J) |
| 0.2–1.5% | of soil release agent according to the invention |

Other conventional additives: sodium sulfate, complexing agents, phosphonates, optical brighteners, perfume oils, foam suppressants, antirepostion agents, bleach stabilizers.

The crosslinked nitrogenous compounds according to the invention (soil release agents) are present in detergents according to the invention in amounts of from 0.05 to 5% by weight, preferably 0.1 to 4% by weight, in particular 0.2 to 2% by weight.

The invention is explained in detail by means of the following examples.

EXAMPLES

General Method 1

Crosslinking of Polyethyleneimine or Polyethyleneimine Derivatives with the Bisglycidyl Ether of a Polyethylene Glycol of Molecular Weight 1500

A 20 to 22% strength aqueous solution of a polyethylene glycol bisglycydyl ether of average molecular weight 1600 (or its bischlorohydrin) is added in portions to a 25% strength aqueous solution of the polyethyleneimine or derivative at 70° C. until the reaction solution has a viscosity of about 500 to 1000 mpas. The pH of the solution is adjusted to 7.5 to 8.0 with 85% strength formic acid.

This general method can be applied, for example, to polyethyleneimines and their amidation products.

Example A

Polyethyleneimine from 10 mol of Ethyleneimine Crosslinked with Bisglycidylether of a Polyethylene Glycol of Molecular Weight 1500

A 60% strength ethyleneimine solution composed of 43 g (1 mol) of ethyleneimine and 29 g of ice is added dropwise to a catalyst solution composed of 6.0 g. (0.10 mol) of ethylenediamine, 2.2 g (0.05 mol) of $CO_2$ and 17 g of deionized water at 90° C. The mixture is then stirred at 90° C. until the Preußmann test* for alkylating substances is negative. The product obtained in this way is crosslinked with the bisglycidyl ether by general method 1.

Example B
Polyethyleneimine from 20 mol of Ethyleneimine Crosslinked with Bisglycidylether of a Polyethylene Glycol of Molecular Weight 1500

A 60% strength ethyleneiniine solution composed of 43 g (1 mol) of ethyleneimine and 29 g of ice is added dropwise to a catalyst solution composed of 3.0 g (0.05 mol) of ethylenediamine, 1.1 g (0.025 mol) of $CO_2$ and 17 g of deionized water at 90° C. The mixture is then stirred at 90° C. until the Preußmann test* for alkylating substances is negative. The product obtained in this way is crosslinked with the bisglycidyl ether by general method 1.

Example C
Amidation of Polyethyleneimine with Benzoic Acid 20:1, Crosslinked with Bisglycidyl Ether of a Polyethylene Glycol of Molecular Weight 1500

183.18 g of benzoic acid (1.5 mol) are introduced in portions into 1290 g of anhydrous Polyethyleneimine (=30 Eq N), prepared as in Example A, under nitrogen at 140° C. The mixture is then stirred at 180° C. until the acid number is less than 5% of the initial value. The product obtained in this way is crosslinked with the bisglycidyl ether by general method 1.

Example D
Amidation of Polyethyleneimine with Benzoic Acid 10:1, Crosslinked with Bisglycidyl Ether of a Polyethylene Glycol of Molecular Weight 1500

183.2 g of benzoic acid (1.5 mol) are introduced in portions into 645 g of anhydrous polyethyleneimine (=15 Eq N), prepared as in Example B, under nitrogen at 140° C. The reaction temperature is raised to 180° C., and the water formed in the reaction is distilled out under a gentle stream of nitrogen until the acid number is less than 5% of the initial value. The product obtained in this way is crosslinked with the bisglycidyl ether by general method 1.

General Method 2
Crosslinking of Tetraaminopropylethylenediamine and Derivatives with Bisglycidyl Ether of a Polyethylene Glycol of Molecular Weight 1500

An approximately 2% strength aqueous solution of a polyethylene glycol bisglycidyl ether of molecular weight 1600 (or its bischlorohydrin) is added in portions to a 25% strength aqueous solution of tetraaminopropylethylenediamine at 70° C. until the reaction solution has a viscosity of about 500 to 1000 mPas. If the pH falls below 9, NaOH (5% strength) is added in portions until the pH reaches 10.5.

This method can be used for tetraaminopropylethylenediamine, its higher homologs and for their amidation products with various degrees of amidation.

Example E
N,N,N',N'-Tetraaminopropyl-1,2-ethylenediamine (N6 Amine), Crosslinked with Bisglycidyl Ether of a Polyethylene Glycol of Molecular Weight 1500

Preparation of N,N,N',N'-tetracyanoethyl-1,2-ethylenediamine: 443 g (8.35 mol) of acrylonitrile are added over the course of 90 minutes to a solution of 100 g (1.67 mol) of 1,2-ethylenediamine in 1176 ml of water. The temperature must not exceed 40° C. during this. After the addition of the acrylonitrile is complete, the flask is stirred for 1 hour at 40° C. and for two further hours at 80° C. Excess acrylonitrile is subsequently distilled off, and then most of the water is distilled off by applying a water pump or oil pump vacuum. The tetracyanoethylated ethylenediamine is recrystallized from methanol and filtered off with suction. The yield is 478 g (1.58 mol).

Preparation of N,N,N',N'-tetraaminopropyl-1,2-ethylenediamine N6 amine): 400 ml/h of a mixture of 20% by weight N,N,N',N'-tetracyanoethyl-1,2-ethylenediamine and 8% by weight N-methylpyrrolidone and 3500 ml/h of ammonia are passed over 4 l of a fixed bed catalyst of composition 90% by weight CoO, 5% by weight MnO, 5% by weight $P_2O_5$ in a 5 l fixed bed reactor at 130° C. under a pressure of 200 bar of hydrogen. Removal of the N-methylpyrrolidone under reduced pressure and fractional distillation (boiling point: 218° C. under 6 mbar) result in N,N,N',N'-tetra-aminopropyl-1,2-ethylenediamine (N6 amine) in 95% yield. The product was checked for purity and completeness of the reaction by $^{13}C$ and $^{1}H$ NMR and mass spectroscopy.

The product obtained in this way is crosslinked with the bisglycidyl ether by general method 2.

(* Preußmann test=test for alkylating compounds, procedure described by J. Epstein et al., Analyt. Chem. 27 (1955) 1435 and R. Preußmann et al., Arzneimittelforsch. 19 (1969) 1059.)

Washing Tests

The soil release effect of the compounds according to the invention was determined in washing tests in a Launder-O-meter under standardized conditions. The detergent formulation (composition I in Table 4) was used for the tests. Use of detergent formulations II to XI is likewise possible according to the invention.

Detergent formulation I was initially investigated without a compound according to the invention and subsequently with the compounds according to the invention from Examples A to E in concentrations of 2% of the total weight of detergent. The test fabrics were prewashed three times with detergent formulation I with these additives (prewash; washing conditions hereinafter), dried and stained with 0.2 g of used engine oil. The oil spots were left to age for 14 hours. The test fabrics were then washed a with detergent formulation I with additives (main wash), and the soil detachment was determined.

| Washing conditions | |
|---|---|
| Machine: | Launder-O-meter from Atlas, Chicago |
| Wash liquor: | 250 ml |
| Washing time: | 30 min at 60° C. |
| Detergent dose: | 6 g/l |
| Water hardness: | 3 mmol; Ca:Mg 4:1 |
| Liquor ratio: | 1:12.5 |
| Test fabrics: | Cotton 221, PES850, PES/cotton 65:53 blended fabric |

Washing Result

To determine the washing result, the reflectances were determined for the test fabric before washing ($R_o$), for the stained test fabric before the main wash (R before) and after the main wash (R after). The percentage soil release was then determined using $$\% \text{ soil release} = R \text{ after} - R \text{ before})/(Ro - R \text{ before}) \times 100$$

A higher percentage soil release means better removal of the spot. Complete removal of the spot corresponds to 100%. The crucial point in this connection is the difference in % soil release between the detergent formulation without and with the compound according to the invention. A greater difference between % soil release without and with compound according to the invention means a greater improvement in the washing result with the detergent formulation on addition of the compound according to the invention. The results of the washing tests are indicated in Tables 1 and 2.

TABLE 1

Improvement in the soil detachment by addition of 2% of the compounds according to the invention
Fabric: Polyester PES 850

| Example | R before | R after | Difference | % Soil release |
|---------|----------|---------|------------|----------------|
| without | 23.6 | 50.5 | 26.9 | 45.3 |
| A | 24.1 | 64.4 | 40.3 | 68.5 |
| B | 25.4 | 65.8 | 40.4 | 70.3 |
| C | 24.7 | 96.2 | 44.5 | 76.4 |
| D | 24.6 | 67.7 | 43.1 | 73.8 |
| E | 25.1 | 64.5 | 39.4 | 68.2 |

TABLE 2

Difference between single wash cycle performance and soil release effect
Fabric: Polyester PES 850

| Example | Mode | R before | R after | % Soil Release | % SR with – % SR without* |
|---------|------|----------|---------|----------------|---------------------------|
| A | with/without | 22.4 | 55 | 53.8 | 13.2 |
|   | without/with | 23.8 | 44.5 | 34.9 | −5.7 |
| D | with/without | 23.7 | 63.7 | 67.4 | 26.8 |
|   | without/with | 23.8 | 46.4 | 38.2 | −2.4 |

TABLE 2-continued

Difference between single wash cycle performance and soil release effect
Fabric: Polyester PES 850

| Example | Mode | R before | R after | % Soil Release | % SR with – % SR without* |
|---------|------|----------|---------|----------------|---------------------------|
| E | with/without | 23.9 | 60.2 | 61.4 | 20.8 |
|   | without/with | 23.8 | 47.2 | 39.5 | −1.1 |

*% SR without = 40.6

It is evident from Tables 1 and 2 that the compounds according to the invention of Examples A to E distinctly improve soil detachment during washing. The degree of whiteness of the fabric after washing, R after, is significantly improved by adding the compounds according to the invention.

The results indicated in Table 2 make it clear that the improved soil detachment is a soil release effect and not a pure single wash cycle effect. In the series of tests on which this test was based, two different application variants were carried out:

Mode 1: three prewashes with detergent with additive, main wash (after staining) without additive in the detergent (=with/without)

Mode 2: three prewashes without additive in the detergent, main wash (after staining) with detergent with additive (=without/with)

If, in Mode 1, there is an improvement in soil detachment compared with the test with prewash and main wash with detergent but without additive (% SR without), a soil release effect is achieved. If, in Mode 2, there is an improved soil detachment, a single wash cycle effect is achieved. It is evident from the results in Table 2 that improved soil detachment can be achieved only in Mode 1, so that the effect achieved by the products according to the invention derives from a soil release action.

The crosslinked polyamines were also employed in combination with corresponding but uncrosslinked polyamines. The results are shown in Table 3.

TABLE 3

Improvement in soil detachment on addition of combinations of uncrosslinked and crosslinked polyamines
In each case 2 + 2% test substance

| | Cotton | | | Blended fabric | | | Polyester | | |
|---|---|---|---|---|---|---|---|---|---|
| Example | R before | R after | % SR | R before | R after | % SR | R before | R after | % SR |
| without | 22.7 | 63 | 69.4 | 25.4 | 60.1 | 60.3 | 19.2 | 41.9 | 35.9 |
| A + A' | 21.6 | 65.9 | 74.4 | 21.9 | 64.5 | 96.8 | 16.4 | 55.2 | 58.9 |
| C + C' | 21.8 | 67.8 | 77.9 | 24.8 | 70.9 | 79.3 | 18.3 | 62 | 68.4 |
| E + E' | 21.7 | 68.3 | 78.7 | 24.3 | 70.8 | 79.3 | 19.3 | 56.3 | 59.2 |
| C + OA | 21.9 | 77.3 | 94 | 21.7 | 71.2 | 80.8 | 19.4 | 74 | 86.9 |

A' = Example A, uncrosslinked
C' = Example C, uncrosslinked
E' = Example E, uncrosslinked
OA = octylamine It is evident from the results shown in Table 3 that mixtures of crosslinked and uncrosslinked polyamines can be employed advantageously for washing all common textiles such as cotton polyester and fabrics blended from cotton and polyester.

TABLE 4

Composition of detergent formulations

Composition in %

| Ingredients | I | II | III | IV | V | VI | VII | VIII | IX | X | XI | XII |
|---|---|---|---|---|---|---|---|---|---|---|---|---|
| Linear $C_{12}$-alkylbenzenesulfonate (Na salt) | 9 | | 11 | 11 | 11 | | | | | | | |
| $C_{12}$–$C_{18}$-alkyl sulfate | 1.5 | 9 | 1 | 1 | | 8 | 8 | 10 | 10 | 10 | | 8 |
| $C_{12}$ Fatty alcohol × 2EO sulfate | | | | | | | | | | | | 2 |
| Oleylsarcosine Na salt | | | | | | | | | | | 9 | |
| $C_{12}$–$C_{18}$ Fatty alcohol × 4EO | | | | | | | | | | | | 3 |
| $C_{12}$–$C_{18}$ Fatty alcohol × 7EO | | 7 | | | | 7 | 7 | | | | | |
| $C_{13}$–$C_{15}$ Oxo alcohol × 7EO | 7 | | 6 | 6 | 6 | | | | | | 8 | |
| $C_{16}$–$C_{18}$-Glucamide | | | | | | | | | | | | 4 |
| $C_{12}$–$C_{14}$-Alkyl polyglucoside | | | | | | | | 9 | 9 | | | |
| $C_{8}$–$C_{18}$-Fatty acid methyltetraglycolamide | | | | | | | | | | 9 | | |
| Soap | 2 | 2 | 2 | 2 | 2 | 1 | 1 | 1 | 1 | 1 | 1 | 2 |
| Na metasilicate × 5.5$H_2O$ | | | | | | | | 3 | 3 | 3 | 3 | |
| Mg silicate | 1 | 1 | 2 | 2 | 2 | 3 | 3 | | | | | |
| Na silicate | | | 2 | 2 | 2 | 3 | 3 | | | | | |
| Zeolite A | 45 | 45 | 40 | 40 | 40 | 36 | 20 | 30 | 30 | 30 | 30 | 20 |
| Zeolite P | | | | | | | 10 | | | | | |
| Sheet silicate SKS6 | | | | | | | | | | | | 15 |
| Sodium carbonate | 7 | 7 | 6 | 6 | 6 | 12 | 10 | 8 | 8 | 8 | 8 | |
| Sodium citrate | 12 | 12 | | | | 5 | | | | | | 5 |
| Sodium citrate × 2$H_2O$ | | | 18 | 18 | 18 | | | | | | | |
| MGDA tri-Na | | | | | | | 5 | 5 | 5 | | | |
| Phosphonate | | | | 1 | | | | | | 1 | 2 | |
| TAED | | | | | | 4 | 4 | 4 | 4 | 4 | 4 | 5 |
| Sodium perborate × 4$H_2O$ | | | | | | | | | 20 | | | |
| Sodium perborate × 1$H_2O$ | | | | | | | | 14.4 | | 14.4 | 14.4 | |
| Sodium percarbonate | | | | | | 15 | 15 | | | | | 15 |
| Carboxymethylcellulose | 1 | 1 | 1 | 1 | 1 | 1.5 | 1 | 1.2 | 1.2 | 1.2 | 1.2 | 1 |
| Lipase | 0.2 | 0.2 | | 0.2 | 0.2 | 0.2 | 0.2 | 0.2 | 0.2 | 0.2 | 0.2 | 0.2 |
| Protease | 0.3 | 0.3 | | 0.3 | 0.3 | 0.3 | 0.3 | 0.3 | 0.3 | 0.3 | 0.3 | 0.3 |
| Cellulase | 0.5 | 0.5 | | 0.5 | 0.5 | 0.5 | 0.5 | 0.5 | 0.5 | 0.5 | 0.5 | 0.5 |
| Sodium sulfate | 3 | 3 | 3 | 3 | 3 | 2 | 3 | 3 | 3 | 3 | 3 | 3 |
| Polymer (AA/MA copolymer) | 5 | 5 | 5 | 5 | 5 | 3 | 5 | 5 | 5 | 5 | 5 | 5 |
| Soil release polymer | 2 | 1 | | 1 | 1 | 0.5 | 0.5 | 0.5 | 0.5 | 0.5 | 0.5 | 0.5 |
| Color transfer inhibitor | 1.5 | | 1 | 1 | 1 | 0.5 | | | | | | |
| Water | to 100 | to 100 | to 100 | to 100 | to 100 | to 100 | to 100 | to 100 | to 100 | to 100 | to 100 | to 100 |

Enzyme-stabilizing Action

To test the enzyme-stabilizing action of the compounds according to the invention, they were incorporated into a liquid detergent formulation, and a protease was added to the latter. After 25 and 50 days, washing tests were carried out with soiled test fabric. Detergent formulations without added enzyme and with added enzyme but without addition of the compounds according to the invention were used for comparison.

The washing tests were evaluated by measuring the color strength of the test fabrics and determining the single wash cycle effect $A_{sba}$ from the color strength by the method described in A Kud, Seifen, Öle, Fette, Wachse, 119 (1993), 590–594.

| Test conditions | |
|---|---|
| Storage: | |
| Storage temperature for the liquid detergent formulation: | 30° C. |
| Enzyme: | Protease, Savinase ® 16L (manufactured by Novo Nordisk) |
| Amount of enzyme | 0.4% Savinase 16L |
| Storage time: | 50 days |
| Washing conditions: | |
| Machine: | Launder-O-meter |
| Soiled fabric: | 2.5 g of CFT AS 10 (Pigment/oil/milk) |
| Ballast fabric: | 5.0 g of cotton |
| Detergent: | Formulation XII hereinafter |
| Amount: | 4.0 g/l |
| Amount of liquor: | 250 g |
| Washing temperature: | 20° C. |
| Water hardness: | 3 mmol/l |

-continued

| Test conditions | | |
|---|---|---|
| Ca/Mg ratio: | 4.0:1.0 | |
| Washing time: | 15 min | |
| Detergent formulation XII: | | |
| Linear alkylbenzenesulfonate | 19.5 | |
| Coconut fatty acid | 8.3 | |
| $C_{13/15}$ oxo alcohol ethoxylate | 16.8 | |
| Ethanol | 0.7 | |
| 1,2-Propanediol | 11.0 | |
| Ethanolamine | 9.4 | |
| Citric acid | 4.8 | |
| Sokolan ® CP5 | 0.9 | |
| Dequest ® 2006 | 1.0 | |
| (manufactured by Monsanto) | | |
| Savinase ® 16L | 0.4 | |
| | (or 0 in the comparative test without enzyme) | |
| Polymer according to the invention | 2.5 | |
| | (or 0 in the comparative test without polymer) | |

The results are listed in Table 5 hereinafter.

TABLE 5

Results of tests on enzyme stabilization

| Test | Storage [days] | Amount of enzyme [%] | Polymer | Amount of polymer [%] | Single wash cycle effect $A_{ohm}$ [%] |
|---|---|---|---|---|---|
| 1 | 25 | — | — | — | 38 |
| 2 | 25 | 0.4 | — | — | 55 |
| 3 | 25 | — | C | 2.5 | 37 |
| 4 | 25 | 0.4 | C | 2.5 | 66 |
| 5 | 50 | — | — | — | 41 |
| 6 | 50 | 0.4 | — | — | 46 |
| 7 | 50 | 0.4 | C | 2.5 | 68 |

The polymer from Example C was used as polymer. The results in Table 5 show that a distinctly improved enzyme activity on prolonged storage is achieved with the crosslinked compounds according to the invention by comparison with the tests without added polymer. After storage of the liquid detergent without compound according to the invention at 30° C. for 50 days, the protease action has been almost completely lost, whereas there is still a high protease activity in the formulations with compound C after 50 days.

We claim:

1. A water-soluble cross inked product obtainable by crosslinking amines of the formula (II)

$(R^1R^1)N—X—N(R^1R^1)$      (II)

where the radicals $R^1$ are $(R^2R^2)N$—$(CH_2)_n$ radicals,
the radicals are $R^2$ are hydrogen atoms or $(R^3R^3)N$—$(CH_2)_n$— radicals,
  the radicals $R^3$ are hydrogen atoms or $(R^4R^4)N$—$(CH_2)_n$— radicals,
  the radicals $R^4$ are hydrogen atoms or $(R^5R^5)N$—$(CH_2)_n$— radicals,
  the radicals $R^5$ are hydrogen atoms or $(R^6R^6)N$—$(CH_2)_n$— radicals, the radicals $R^6$ are hydrogen atoms,
n is 2, 3 or 4, and
the radical X is one of the radicals

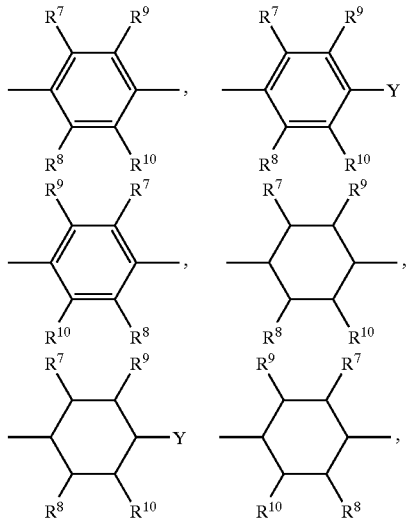

—$(CH_2)_p$—, —$(CH_2)_3$—$NR^{11}$—$(CH_2)_3$—, —$(CH_2)_l$—$\{O—(CH_2)_k\}_m$—$O$—$(CH_2)_l$—$C_{2-20}$-alkylene,
the radical Y is an oxygen atom, a $CR^7R^9C=O$ or $SO_2$ radical,
p is an integer from 2–20,
l and k are, independently of one another, an integer from 2–6, m is an integer from 1–40,
the radicals $R^7$, $R^8$, $R^9$ and $R^{10}$ are, independently of one another, hydrogen atoms or $C_{1-6}$-alkyl radicals,
and the radical $R^{11}$ is $C_{1-20}$-alkyl, $C_{2-20}$-dialkylamino-$C_{2-10}$-alkyl, $C_{1-10}$-alkoxy-$C_{2-10}$-alkyl, $C_{2-20}$-hydroxyalkyl, $C_{3-12}$-cycloalkyl, $C_{4-20}$-cycloalkylalkyl, $C_{2-30}$-alkenyl, $C_{4-30}$-dialkylaminoalkenyl, $C_{3-30}$-alkoxyalkenyl, $C_{3-20}$-hydroxyalkenyl, $C_{5-20}$-cycloallcylalkenyl, an aryl or a $C_{7-20}$-arykalkyl radical which is unsubstituted or substituted one to five times by $C_{1-8}$-alkyl, $C_{2-8}$-dialkylamino, $C_{1-8}$-alkoxy, hydroxyl, $C_{3-8}$-cycloalkyl and/or $C_{4-12}$-cycloalkylalkyl, or two radicals $R^{11}$ together form an alkylene chain which may be interrupted by nitrogen or oxygen, such as from ethylene oxide, propylene oxide, butylene oxide and —$CH_2$—$CH(CH_3)$—$O$— or polyisobutylene with 1 to 100 isobutylene units,
with at least one bifunctional crosslinker (b) which reacts with NH groups.

2. A water-soluble crosslinked product of claim 1, in which the amine of general formula (II) is N,N,N',N'-tetraaminopropyl-1,2-ethylene diamine.

3. The product as claimed in claim 1, wherein the crosslinker (b) is selected from the group consisting of the halogen-free crosslinkers:
(1) polyepoxides,
(2) ethylene carbonate, propylene carbonate and/or urea,
(3) monoethylenically unsaturated carboxylic acids and their esters, amides and anhydrides, at least dibasic carboxylic acids or polycarboxylic acids, and their esters, amides and anhydrides,
(4) products of the reaction of polyetherdiamines, alkylenediamines, polyalkylenepolyamines, bifunctional or multifunctional alcohols, alkylene gylcols, polyalkylene glycols, functionalized polyesters or polyamides or their mixtures with monoethylenically unsaturated carboxylic acids or their esters, amides or anhydrides, the reaction products having at least two ethylenic double bonds, carboxamide, carboxyl or ester groups as functional groups, (5) products, containing at least two aziridino groups, of the reaction of dicarboxylic esters with ethyleneimine,
(6) cumulenes and polyheterocumulenes,
(7) β-keto esters, β-keto acids and β-keto aldehydes,
(8) functionalized glycidyl ethers;

the halogen-containing crosslinkers:
(9) polyhalides,
(10) glycidyl halides,
(11) chloroformates and chloroacetic acid derivatives,
(12) epichlorohydrin, glycerol chlorohydrin, polyether dichlorohydrin compounds,
(13) phosgene;

and mixtures thereof.

4. The product as claimed in claim 1, wherein the crosslinker (b) is a bisglycidyl ether of a polyethylene glycol with a weight average molecular weight of from 300 to 3000.

5. A detergent or cleaner comprising the product as defined in claim 1, and at least one surfactant.

6. The detergent or cleaner as claimed in claim 4, further comprising at least one enzyme.

* * * * *